(12) United States Patent
Horner

(10) Patent No.: US 6,412,284 B1
(45) Date of Patent: Jul. 2, 2002

(54) METHODS AND APPARATUS FOR SUPPLYING AIR TO GAS TURBINE ENGINES

(75) Inventor: Michael William Horner, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/801,120

(22) Filed: Mar. 7, 2001

(51) Int. Cl.[7] .............................................. F02C 7/20
(52) U.S. Cl. ........................ 60/772; 60/39.52; 60/797
(58) Field of Search ........................... 60/772, 39.511, 60/39.52, 797

(56) References Cited

U.S. PATENT DOCUMENTS

| | | | | |
|---|---|---|---|---|
| 2,404,275 A | * | 7/1946 | Clark | 60/41 |
| 2,474,068 A | * | 6/1949 | Sammons | 230/132 |
| 2,670,597 A | * | 3/1954 | Villemejane | 60/39.2 |
| 4,029,035 A | | 6/1977 | German | |
| 4,313,300 A | * | 2/1982 | Wilkes | 60/39.02 |
| 4,528,811 A | * | 7/1985 | Stahl | 60/39.07 |
| 5,232,385 A | | 8/1993 | Hatfield | |
| 6,134,876 A | | 10/2000 | Hines et al. | |

* cited by examiner

Primary Examiner—Ehud Gartenberg
(74) Attorney, Agent, or Firm—Rodney M. Young; Armstrong Teasdale LLP

(57) ABSTRACT

A gas turbine engine assembly including a gas turbine engine mounted within a module and including an inlet in flow communication with a module inlet area and a module exhaust area is described. The turbine engine also includes an exhaust, and is mounted within an engine area between the module inlet and exhaust areas. More specifically, the gas turbine engine is mounted such that the engine exhaust is in flow communication with the module exhaust area. Because the module also includes a secondary supply duct, the gas turbine engine is in flow communication with the module inlet and exhaust areas.

19 Claims, 3 Drawing Sheets

METHODS AND APPARATUS FOR SUPPLYING AIR TO GAS TURBINE ENGINES

BACKGROUND OF THE INVENTION

This invention relates generally to gas turbine engines and, more particularly, to modules used to house turbine engines.

Gas turbine engines are used as a power source within a variety of applications. To protect the engine from the environment, and to shield a surrounding structure from the gas turbine engine, the gas turbine engine is typically mounted within a module. The module has an inlet area, an exhaust area, and an engine area that extends between the inlet area and the exhaust area.

To facilitate reducing noise and heat generated during engine operation, and to provide a secure mounting platform, in marine applications the engine module is typically located in a lower portion of a ship hull. Because engines require continuous airflow for operation, within at least some known modules, the module inlet and exhaust areas include ducts to route ambient air from outside the hull to the engine, and to channel exhaust gases produced during operation of the engine from the hull, respectively.

To reduce a risk of water inadvertently entering or blocking an entrance to the module inlet ducts, the module inlet ducts are routed to emerge from the hull at elevations that are considerably higher than elevations where water typically contacts the hull. However, during operation, waves may still contact the inlet to the module inlet duct, and limit an amount of air that may be supplied to the engine. Over time, blockage of the module inlet entrance may cause the engine to stall or eventually shutdown.

BRIEF SUMMARY OF THE INVENTION

In an exemplary embodiment, a gas turbine engine assembly includes a gas turbine engine mounted within a module including an inlet in flow communication with a module inlet area and a module exhaust area. The gas turbine also includes an exhaust, and is mounted within an engine area of the module that extends between the module inlet and exhaust areas. The engine is mounted such that the engine exhaust is in flow communication with the module exhaust area. The module also includes a secondary supply duct connected to the module exhaust area and in flow communication with the gas turbine engine inlet.

In use, during normal operation, air is supplied to the engine inlet through the module inlet area. When the entrance to the module inlet area becomes blocked, air is routed from the module exhaust area to the gas turbine engine inlet. More specifically, in the exemplary embodiment, air is routed from the module exhaust area to the module inlet area upstream from the gas turbine engine inlet. As a result, the secondary supply duct facilitates continued operation of the gas turbine engine despite the module inlet entrance being blocked.

DETAILED DESCRIPTION OF THE INVENTION

Figure 1:
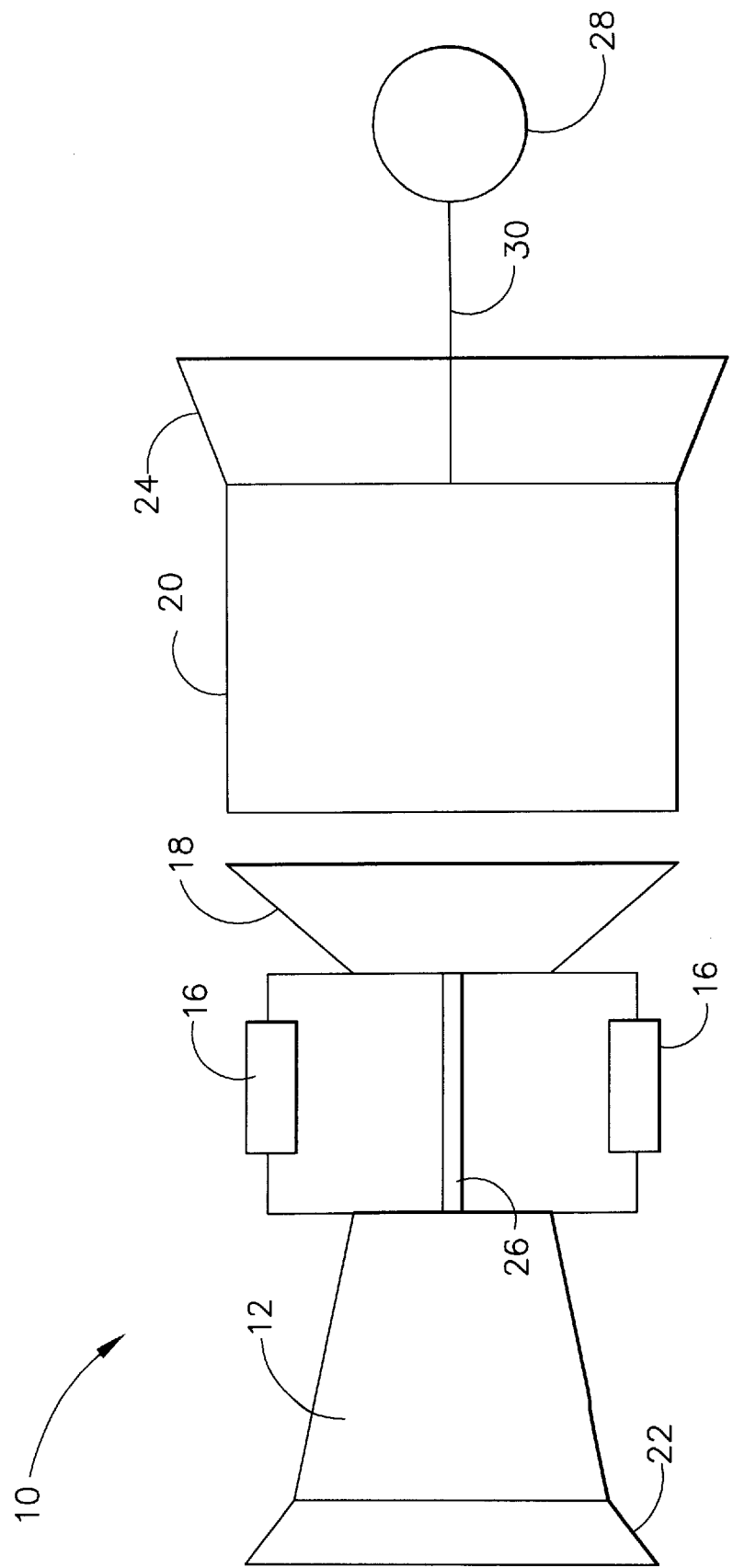
FIG. 1 is a schematic illustration of a gas turbine engine.

FIG. 1 is a schematic illustration of a gas turbine engine 10 including at least one compressor 12, a combustor 16, a high pressure turbine 18, a low pressure turbine 20, an inlet 22, and an exhaust nozzle 24 connected serially. In one embodiment, engine 10 is an LM2500 engine commercially available from General Electric Company, Cincinnati, Ohio. Compressor 12 and turbine 18 are coupled by a first shaft 26, and turbine 20 and a driven load 28 are coupled by a second shaft 30.

In operation, air flows into engine inlet 22 through compressor 12 and is compressed. The compressed air is then delivered to combustor 16 where it is mixed with fuel and ignited. Airflow from combustor 16 drives rotating turbines 18 and 20 and exits gas turbine engine 10 through exhaust nozzle 24.

Figure 2:
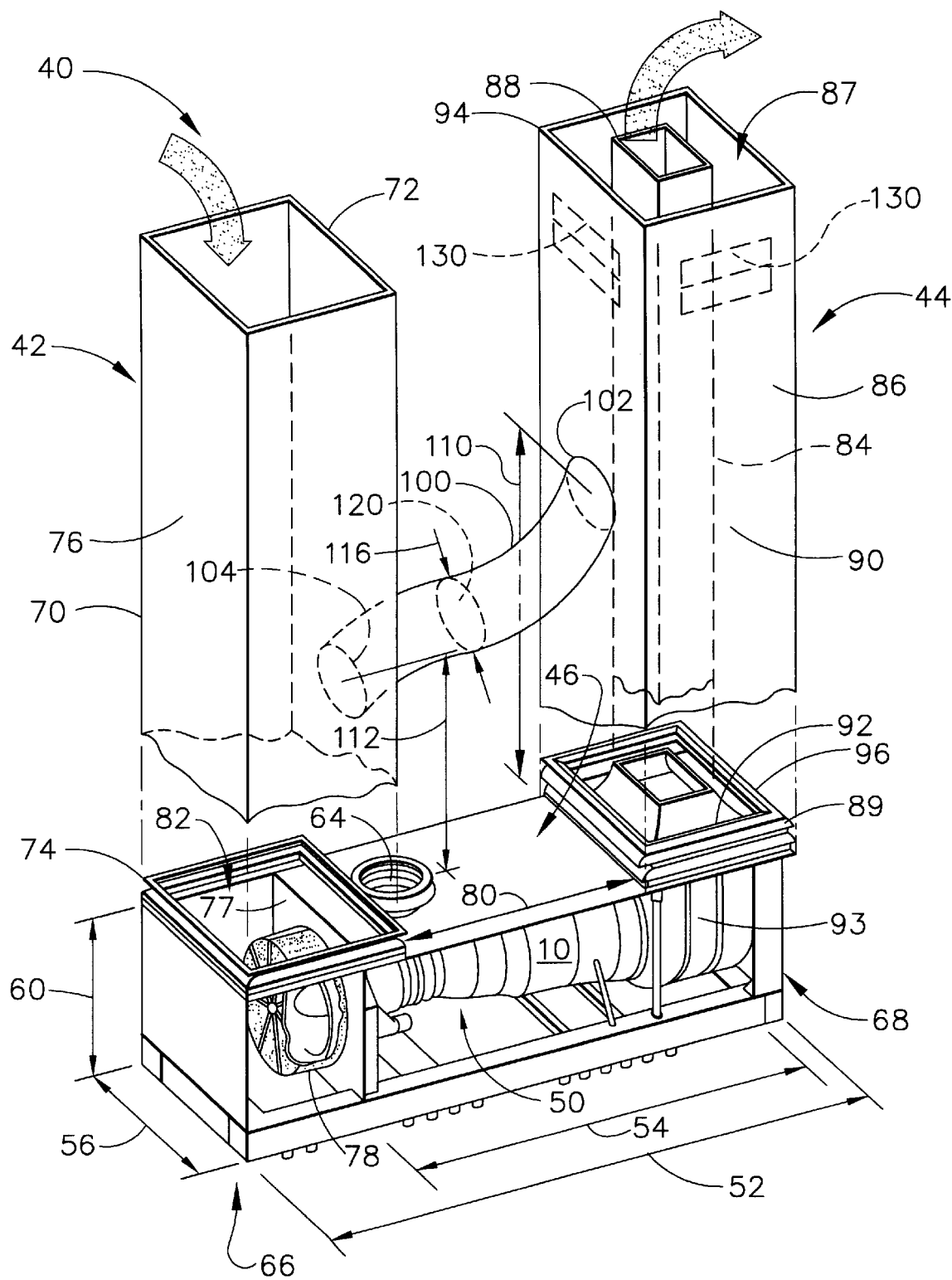
FIG. 2 is a perspective view of a module that could be used with the gas turbine engine shown in FIG. 1.

FIG. 2 is a perspective view of a module 40 that could be used with a gas turbine engine similar to engine 10 shown in FIG. 1. Module 40 includes an inlet area 42, an exhaust area 44, and an engine area 46 extending between inlet and exhaust areas 42 and 44, respectively. Module 40 is used within structures (not shown) that utilize power generated by engine 10. In one embodiment, module 40 is installed within a ship (not shown).

Module engine area 46 extends between module inlet area 42 and module exhaust area 44. Engine area 46 defines a cavity 50 sized to receive engine 10 therein. More specifically, engine area 46 has a length 52 that is longer than an overall length 54 of engine 20, and a width 56 that is wider than a width (not shown) of engine 10. In addition, module engine area 46 has a height 60 that is taller than a height (not shown) of engine 10.

In the exemplary embodiment, module engine area 46 includes a port opening 64 that provides cooling air to engine area cavity 50. Engine area 46 also includes a first end 66 and a second end 68. Module engine area first end 66 is attached in flow communication with module inlet area 42, and engine area second end 68 is attached in flow communication with module exhaust area 44. Engine 10 is mounted within module engine area cavity 50 such that engine inlet 22 is adjacent module inlet area 42, and engine exhaust nozzle 24 is adjacent module exhaust area 44. In the exemplary embodiment, inlet area 42 and exhaust area 44 extend substantially perpendicularly from module engine area 46.

Module inlet area 42 includes an inlet duct 70 having a first end 72, a second end 74, and a body 76 extending therebetween. Inlet duct second end 74 is attached in flow communication with module engine area 46 and inlet duct first end 72 is attached to a structure entrance (not shown) to receive ambient airflow. Accordingly, inlet duct 70 is in flow communication with gas turbine engine inlet 22. In the exemplary embodiment, inlet duct 70 has a substantially rectangular cross-sectional profile.

An inlet barrier wall 77 extends substantially perpendicularly across module engine area 46 through engine area cavity 50. Inlet barrier wall 77 includes an opening 78 sized to receive engine 10 therein. More specifically, engine inlet 22 extends through inlet barrier opening 78 to be in a flowpath (not shown) of air exiting module inlet area 42. Accordingly, inlet barrier wall 77 separates a remaining portion 80 of module engine area 46 from a portion 82 of module inlet area 42 adjacent engine inlet 22, and prevents airflow from flowing around engine 10. As a result, airflow entering inlet duct 70 is routed through engine 10.

Module exhaust area 44 includes an exhaust duct 84 and a structural sleeve 86. Exhaust duct 84 is positioned concentrically within structural sleeve 86 such that a cavity 87 is defined between exhaust duct 84 and structural sleeve 86.

In the exemplary embodiment, exhaust duct 84 and structural sleeve 86 have substantially rectangular cross-sectional profiles. Exhaust duct 84 has a first end 88, a second end 89, and a body 90 extending therebetween. Exhaust duct first end 88 is attached to a structure outlet (not show) for exhausting combustion gases from engine 10.

Exhaust duct second end 89 is attached tangentially around an exhaust flange 92 extending from module engine area second end 68 such that exhaust flange 92 is in flow communication with, and extends into exhaust duct 84. Accordingly, exhaust duct 84 is in flow communication with gas turbine engine exhaust nozzle 24 (shown in FIG. 1). More specifically, an exhaust collector 93 is coupled to gas turbine engine exhaust nozzle 24 between engine exhaust nozzle 24 and exhaust duct 84. Exhaust flow discharged from engine 10 is collected in exhaust collector 93 prior to entering exhaust duct 84.

Structural sleeve 86 is attached to module engine area 46. More specifically, structural sleeve 86 includes a first end 94 and a second end 96. Structural sleeve first end 94 is attached to the structure outlet, and sleeve second end 96 is attached to module engine area second end 68.

A secondary supply duct 100 extends between module exhaust area 44 and module inlet area 42. Secondary supply duct 100 includes a first end 102 and a second end 104. Secondary supply duct first end 102 extends through structural sleeve 86, and connects in flow communication with exhaust area cavity 87. Secondary supply duct second end 102 connects in flow communication with inlet duct 70.

Secondary supply duct first end 102 connects with exhaust duct body 90 a distance 110 above module engine area 46, and secondary supply duct second end connects with inlet duct 70 a distance 112 above module engine area 46. First end distance 110 and second end distance 112 are variable based on structural considerations of the surrounding structure. Secondary supply duct 100 has a diameter 116 selected to facilitate duct 100 satisfying flow and pressure drop restrictions and requirements imposed by operating engine 10. In one embodiment, secondary supply duct 100 has a non-circular cross-sectional profile and has an equivalent flow area selected to facilitate duct 100 satisfying flow and pressure drop restrictions and requirements imposed by operating engine 10.

Secondary supply duct 100 includes a shutoff damper 120 between module inlet and exhaust areas 42 and 44, respectively. Shutoff damper 120 is selectively operable to control an amount of airflow flowing from exhaust duct 84 to inlet duct 70 through secondary supply duct 100. In one embodiment, shutoff damper 120 is spring-loaded. In a second embodiment, shutoff damper 120 is control actuated.

In use, during normal operation air is supplied to gas turbine engine 10 through the structure inlet and module inlet area 42. However, during operation, the structure inlet may become blocked. For example, if the surrounding structure utilizing module 40 is a ship, ocean waves may block the structure inlet. During such times, a tortuous path or trap (not shown) prevents moisture from impinging upon gas turbine engine 10. Simultaneously, secondary supply duct shutoff damper 120 is opened to route inlet supply air from exhaust area 44 to module inlet area 42.

In one embodiment, exhaust duct 84 is routed to an elevation above an elevation where waves could impinge upon the structure exhaust, and exhaust area 44 includes a plurality of ambient air louvers 130 to permit ambient air to enter exhaust area cavity 87 to be channeled to engine 10 through supply duct 100. Accordingly, air drawn into exhaust area cavity 87 will include a mixture of ambient air and gas turbine exhaust gases. As a result, inlet air routed to engine inlet 22 from secondary supply duct 100 is at a lower temperature than airflow exiting engine nozzle 24.

In addition, cooling air entering module engine area 46 through port opening 64 is discharged from module 40 through exhaust duct 84. Despite the cooling air, exhaust gases exiting engine 10 are at a higher temperature than the ambient air and surrounding support structure. Module exhaust area cavity 87 insulates structural sleeve 86 and the surrounding structure from the higher temperatures generated during engine operation.

Figure 3:
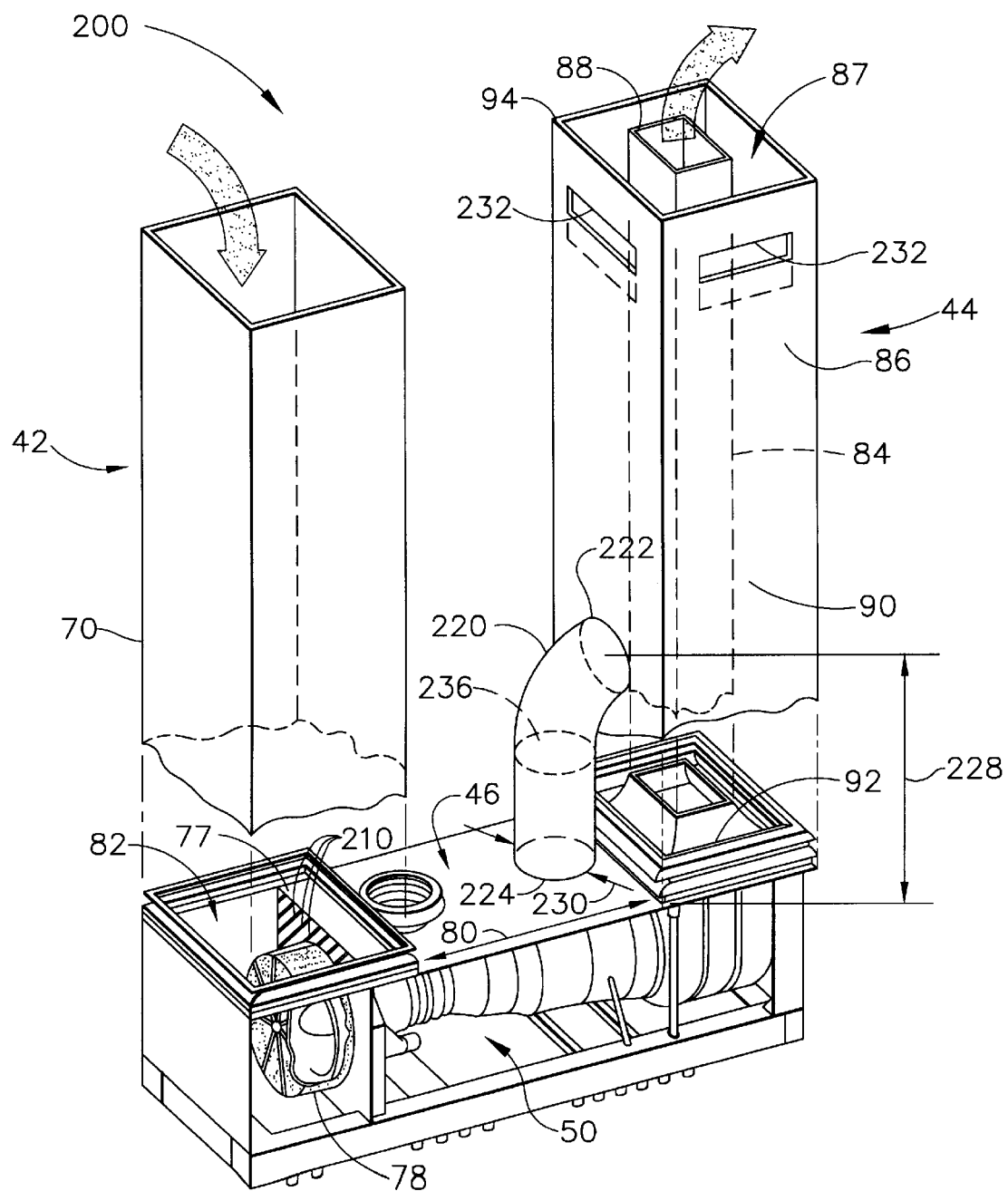
FIG. 3 a perspective view of an alternative embodiment of a module that could be used with the gas turbine engine shown in FIG. 1.

FIG. 3 is a perspective view of a module 200 that could be used with gas turbine engine 10. Module 200 is similar to module 40 shown in FIG. 2 and components in module 200 that are identical to components of module 40 are identified in FIG. 3 using the same reference numerals used in FIG. 2. Accordingly, module 200 includes inlet area 42, exhaust area 44, and engine area 46. Inlet barrier wall 77 extends substantially perpendicularly across module engine area 46 through engine area cavity 50 and includes opening 78.

Inlet barrier wall 77 also includes a plurality of louvers 210. Inlet barrier wall louvers 210 are selectively operable to provide flow communication between module engine area portion 80 and module inlet area portion 82. In an alternative embodiment, inlet barrier wall does not include louvers 210, but instead includes a plurality of spring-loaded blow-in doors (not shown). In another embodiment, louvers 210 are pressure sensitive.

Module 200 includes a secondary supply duct 220 extending between module exhaust area 44 and module engine area portion 80. Secondary supply duct 220 includes a first end 222 and a second end 224. Secondary supply duct first end 222 connects to structural sleeve 86 in flow communication with module exhaust area cavity 87.

Secondary supply duct second end 224 connects in flow communication with module engine area 46. More specifically, secondary supply duct second end 224 connects in flow communication with module engine area portion 80. Secondary supply duct first end 222 connects with exhaust area structural sleeve 86 a distance 228 above module engine area 46, while secondary supply duct second end 224 connects with module engine area 46. Secondary supply duct 220 has a diameter 230 selected to facilitate duct 220 satisfying flow and pressure drop restrictions and requirements imposed by operating engine 10. In one embodiment, secondary supply duct 220 has a non-circular cross-sectional profile and has an equivalent flow area selected to facilitate duct 220 satisfying flow and pressure drop restrictions and requirements imposed by operating engine 10.

Structural sleeve 86 includes a plurality of vents 232 in flow communication with module exhaust area cavity 87. Vents 232 permit ambient air to enter cavity 87 and be supplied to gas turbine engine 10 through secondary supply duct 220.

Secondary supply duct 220 includes a shutoff damper 236 between module inlet and exhaust areas 42 and 34, respectively. Shutoff damper 236 is selectively operable to control an amount of airflow flowing from exhaust duct 84 to inlet duct 70 through secondary supply duct 220. In one embodiment, shutoff damper 236 is spring-loaded. In a second embodiment, shutoff damper 236 is control actuated.

In use, during normal operation air is supplied to gas turbine engine 10 through the structure inlet, and module inlet area 82. However, during operation, the structure inlet may become blocked. In one embodiment, when the surrounding structure utilizing module 200 is a ship, ocean waves may block the structure inlet. During such times, a tortuous path or trap (not shown) prevents moisture from impinging upon gas turbine engine 10. Simultaneously, secondary supply duct shutoff damper 236 is opened to route inlet supply air from exhaust area 44 to module engine area portion 82.

In addition, in one embodiment, module exhaust area structural sleeve vents 232 open to permit ambient air to be drawn into exhaust area cavity 87, thus lowering a temperature of air supplied from cavity 87 through secondary supply duct 220. An insulating effect of cavity 87 is increased as ambient air enters cavity 87 and carries heat from cavity 87 through duct 220. If vents 232 become blocked, due to exposure from waves, for example, then a mixture of ambient air and turbine exhaust gases are drawn into exhaust cavity 87 and channeled through secondary supply duct 220.

As pressure increases within engine module area cavity 50, inlet barrier wall louvers 210 open to permit air to enter engine inlet 22 from module engine area 46. More specifically, as louvers 210 open, module engine area portion 82 becomes in flow communication with engine inlet 22.

The above-described module for a gas turbine engine is cost-effective and highly reliable. The module includes a secondary supply duct that routes air from the module exhaust area to the engine inlet. As a result of the secondary supply duct, the gas turbine engine receives inlet air and continues to operate despite the module inlet duct being blocked. Thus, the module secondary supply duct facilitates the engine operating continuously in a cost-effective and reliable manner despite the module inlet duct being blocked.

While the invention has been described in terms of various specific embodiments, those skilled in the art will recognize that the invention can be practiced with modification within the spirit and scope of the claims.

What is claimed is:

1. A method for supplying air to a gas turbine engine positioned within a housing including an air inlet module, ail exhaust gas module, and a duct, the inlet module connecting an inlet of the gas turbine engine to the atmosphere, the exhaust gas module including a first conduit and a second conduit, the first conduit within the second conduit and connecting an exhaust of the gas turbine engine to the atmosphere, the second conduit open only to the atmosphere, the duct connected to the exhaust gas module second conduit anti in flow communication with the gas turbine engine inlet, said method comprising:

operating the gas turbine engine within the module such that exhaust airflow exits the engine through the exhaust module first conduit; and supplying air to the gas turbine engine inlet from the exhaust module second conduit through the duct.

2. A method in accordance with claim 1 wherein said supplying air to the gas turbine engine inlet further comprises supplying air to the housing inlet module through the duct.

3. A method in accordance with claim 1 wherein the housing further includes an inlet barrier wall extending around the gas turbine engine inlet, said supplying air to the gas turbine engine inlet further comprises supplying air to the gas turbine inlet upstream from the inlet barrier wall.

4. A method in accordance with claim 1 wherein the housing further includes an inlet barrier wall extending around the gas turbine engine inlet, said supplying air to the gas turbine engine inlet further comprises supplying air to the gas turbine inlet through a plurality of vents within the inlet barrier wall.

5. A method in accordance with claim 1 wherein said operating the gas turbine engine within the module further comprises discharging exhaust airflow through an exhaust module first conduit that is coaxially aligned with respect to the exhaust module second conduit.

6. A gas turbine engine housing for a gas turbine engine including an inlet and an exhaust, said housing comprising:

an air inlet module connecting the gas turbine engine inlet to the atmosphere;

an exhaust gas module comprising a first conduit and a second conduit, said first conduit within said second conduit and connecting the gas turbine engine exhaust to the atmosphere, said second conduit open only to the atmosphere; and a duct connecting the turbine inlet in flow communication with said exhaust gas module second conduit.

7. A gas turbine engine housing in accordance with claim 6 wherein said duct comprises a shutoff damper configured to control flow therethrough.

8. A gas turbine engine housing in accordance with claim 6 wherein said exhaust gas module second conduit in selective flow communication with tie gas turbine engine inlet.

9. A gas turbine engine housing in accordance with claim 6 further comprising an inlet barrier wall extending around the gas turbine engine inlet between said air inlet module and said exhaust gas module.

10. A gas turbine engine housing in accordance with claim 9 wherein said duct connected to said air inlet module upstream from said inlet barrier wall.

11. A gas turbine engine housing in accordance with claim 9 wherein said inlet barrier wall further comprises a plurality of vents in flow communication with said duct and the gas turbine engine inlet.

12. A gas turbine engine housing in accordance with claim 6 wherein said duct connected to said air inlet module upstream from the gas turbine engine inlet.

13. A gas turbine engine assembly comprising:

a gas turbine engine comprising an inlet and an exhaust; and a housing comprising an air inlet module, an exhaust module, and a duct coupled to said exhaust module, said gas turbine engine within said housing, said air inlet module connecting said gas turbine engine inlet to the atmosphere, said exhaust gas module comprising a first conduit and a second conduit, said first conduit within said second conduit and connecting said gas turbine engine exhaust to the atmosphere, said second conduit open only to the atmosphere, said duct connecting said gas turbine inlet in flow communication with said exhaust gas module second conduit.

14. A gas turbine engine assembly in accordance with claim 13 wherein said housing second conduit substantially coaxial with said housing first conduit.

15. A gas turbine engine assembly in accordance with claim 13 wherein said housing duct comprises a shutoff damper configured to control flow therethrough.

16. A gas turbine engine assembly in accordance with claim 13 wherein said housing exhaust gas module in selective flow communication with said gas turbine engine inlet.

17. A gas turbine engine assembly in accordance with claim 13 wherein said housing further comprises an inlet barrier wall extending around said gas turbine engine inlet between said housing air inlet module and said housing exhaust gas module.

18. A gas turbine engine assembly in accordance with claim 17 wherein said housing duct connected to said housing air inlet module upstream from said housing inlet barrier wall.

19. A gas turbine engine assembly in accordance with claim 17 wherein said housing inlet barrier wall comprises a plurality of vents in flow communication with said housing duct and said gas turbine engine inlet.

* * * * *

UNITED STATES PATENT AND TRADEMARK OFFICE
CERTIFICATE OF CORRECTION

PATENT NO.      : 6,412,284 B1
DATED           : July 2, 2002
INVENTOR(S)     : Michael William Horner It is certified that error appears in the above-identified patent and that said Letters Patent is hereby corrected as shown below:

<u>Column 15,</u>
Line 40, delete "ail" insert therefor -- an --.
Line 48, delete "anti" insert therefor -- and --.

Signed and Sealed this

Twenty-eighth Day of October, 2003

JAMES E. ROGAN
*Director of the United States Patent and Trademark Office*